United States Patent [19]

Grange

[11] Patent Number: 5,251,756
[45] Date of Patent: Oct. 12, 1993

[54] PACKAGING FOR PRESENTING PARALLELEPIPEDAL GOODS

[75] Inventor: Kenneth Grange, London, England

[73] Assignee: Wilkinson Sword Gesellschaft mit beschränkter Haftung, Solingen, Fed. Rep. of Germany

[21] Appl. No.: 858,673

[22] Filed: Mar. 27, 1992

[30] Foreign Application Priority Data

Mar. 27, 1991 [DE] Fed. Rep. of Germany ... 9103752[U]

[51] Int. Cl.⁵ .......................................... B65D 73/00
[52] U.S. Cl. .................................... 206/461; 206/485; 206/486
[58] Field of Search ............... 206/353, 461, 483, 485, 206/486, 495, 491

[56] References Cited

U.S. PATENT DOCUMENTS

| 2,000,870 | 5/1935 | Ziemmerman . | |
|---|---|---|---|
| 2,598,324 | 5/1952 | Wathon . | |
| 2,706,590 | 4/1955 | Bergstein | 206/485 |
| 3,658,175 | 4/1972 | Vrana . | |
| 3,918,583 | 11/1975 | Adams . | |
| 4,020,694 | 5/1977 | Mayhew . | |
| 4,146,127 | 3/1979 | Bayer | 206/485 |
| 4,285,428 | 8/1981 | Beddall et al. . | |
| 4,300,683 | 11/1981 | Roccaforte | 206/485 |
| 4,496,047 | 1/1985 | Gatley . | |
| 4,518,086 | 5/1985 | Roccaforte | 206/485 |
| 4,558,783 | 12/1985 | Dangerfield . | |
| 4,570,787 | 2/1986 | Forbes, Jr. | 206/461 |

FOREIGN PATENT DOCUMENTS

| 584999 | 9/1933 | Fed. Rep. of Germany . | |
|---|---|---|---|
| 6916136 | 10/1970 | Fed. Rep. of Germany . | |
| 8815750 | 12/1988 | Fed. Rep. of Germany . | |
| 9101125 | 2/1991 | Fed. Rep. of Germany . | |
| 753750 | 10/1933 | France | 206/485 |
| 1336171 | 7/1963 | France | 206/485 |
| 2198466 | 3/1974 | France | 206/485 |
| 2234624 | 6/1974 | France . | |
| 393630 | 6/1933 | United Kingdom | 206/485 |
| 530986 | 12/1940 | United Kingdom . | |

*Primary Examiner*—David T. Fidei
*Attorney, Agent, or Firm*—Robert W. Becker & Associates

[57] ABSTRACT

A packaging for presenting goods of an essentially parallelepipedal shape, especially dispensers containing razor blade units, has a first cardboard strip with a front surface and a back surface, and a second cardboard strip with a front surface and a back surface whereby the back surface of the second cardboard strip is connected to the front surface of the first cardboard strip. The second cardboard strip has a receptacle for holding at least one dispenser. The second cardboard strip has a first and a second folded portion extending parallel to one another and spaced from one another in a direction transverse to the longitudinal direction of the second cardboard strip. The receptacle is in the form of a first and a second opening, whereby the first opening is provided in the first folded portion and the second opening is provided in the second folded portion. Such a packaging is inexpensive and is producible in a simple manner from recyclable materials. It further provides security against theft and a sales-promoting presentation of the goods.

12 Claims, 3 Drawing Sheets

PACKAGING FOR PRESENTING PARALLELEPIPEDAL GOODS

BACKGROUND OF THE INVENTION

The present invention relates to a packaging for presenting essentially parallelepipedal goods, especially dispensers containing razor blade units, comprising a cardboard strip with a receiving means for receiving at least one dispenser and having a second cardboard strip arranged on the first cardboard strip, whereby the second cardboard strip has at least one opening as the receiving means.

Packagings of the aforementioned kind are well known in the prior art. For example, packaging for presenting dispensers for razor blade units are known which are comprised of a paper or cardboard strip with a preferably transparent plastic lid glued thereto whereby the plastic lid has essentially the shape of the parallelepipedal goods (dispensers) presented therewith. In these packagings, which are known as so-called blister packagings, it is disadvantageous that the plastic lid which is glued to the cardboard strip represents an environmental problem with respect to its manufacture as well as its disposal. Such plastic parts can only be separated from the rest of the discarded materials with great expenditures, and its recycling requires expensive and complicated processes. Furthermore, a disadvantage of the aforementioned packagings is that there manufacture is very expensive because different materials are employed and must be assembled. Also, the so-called blister backing of the blister packaging is a hazard to the environment because the visible surface area is coated with a sealing layer which is manufactured with the aid of hydrocarbon-containing solvents.

Packagings of the aforementioned kind usually conform to the shape and contours of the goods to be packed therein. It is especially desirable to design packagings such that the blanks may be automatically produced and a most efficient use of the cardboard or paper material is accomplished.

A packaging for presenting essentially parallelepipedal goods is known from British patent 530 986 in which two receiving means for holding dispensers are arranged on a first paper or cardboard strip, whereby the receiving means are comprised of a second paper or cardboard strip. This known packaging, however, has the disadvantage that it may not be produced in an inexpensive manner since the receiving means must be folded and glued to the base in a complicated process. Furthermore, the known packaging does not provide a possibility to present the goods to be sold in a sales-promoting manner so as to increase sales and to protect the goods against theft from the packaging.

It is therefore an object of the present invention to provide a packaging of the aforementioned kind which may be manufactured in a simple and inexpensive fashion, which presents the goods in a favorable, sales promoting manner, which consists entirely of easily recyclable materials, and which provides safety and securing means against theft according to the modern day requirements of sales psychology in supermarkets.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
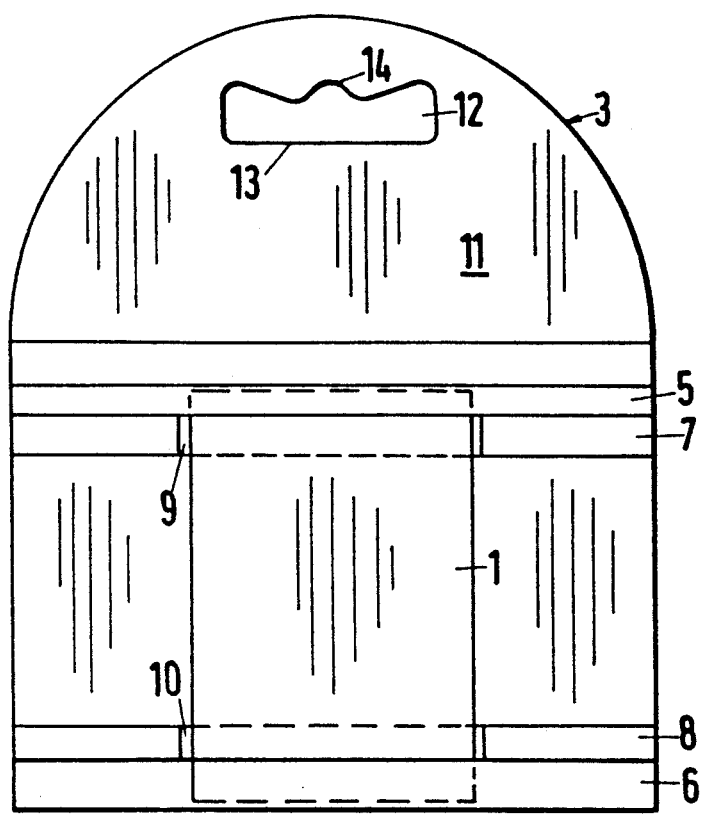
FIG. 1 is a first embodiment of the inventive packaging in a plan view.

The packaging of the present invention for presenting goods of an essentially parallelepipedal shape is primarily characterized by a first cardboard strip having a front surface and a back surface; a second cardboard strip having a front surface and a back surface, with the back surface of the second cardboard strip being connected to the front surface of the first cardboard strip, the second cardboard strip having a receiving means for holding at least one dispenser; the second cardboard strip having a first and a second folded portion extending parallel to one another and spaced from one another in a direction transverse to a longitudinal direction of the second cardboard strip; and the receiving means being in the form of a first and a second opening, with the first opening being provided in the first folded portion and the second opening being provided in the second folded portion.

In the context of this invention, "cardboard" defines paper and cardboard materials.

The inventive packaging has the advantage that it is comprised of two paper or cardboard strips arranged atop one another which are recyclable in a simple manner. A further advantage is that a sales-promoting presentation is possible due to the receiving means in the form of openings provided at the second paper or cardboard strip. In the inventive packaging, the product to be sold is held in the openings such that the product is easily visible to the perspective buyer, but is protected against unauthorized removal. Furthermore, it is advantageous that such a packaging may be produced in a simple manner with relatively low costs since the packaging is comprised only of inexpensive cardboard. Due to the use of cardboard, it is furthermore possible to provide the visible surface areas in a plurality of ways with different designs. Finally, it is also advantageous that the manufacture of cardboard products does not require expensive and complicated machinery as is, for example, required for the manufacture of plastic materials and plastic products since, for example, the production of the blister to be glued onto the backing requires a heat molding step.

The inventive packaging has further the advantage that the goods are presented in an easily visible manner within the openings forming the receiving means. In one particular embodiment, the two paper or cardboard strips are arranged atop one another and are connected to one another by gluing whereby the upper paper or cardboard strip is provided with two folded portions of an essentially square cross-section which projects from the front surface of the upper paper or plastic strip.

In a further embodiment of the present invention, the first (lower) cardboard strip is folded in a U-shaped manner so that the first and the second cardboard strips in the area of the first and second openings are spaced at a distance from one another. In this embodiment, the goods to be presented, for example, dispensers for razor blade units, are inserted into the opening provided at the second cardboard strip whereby the goods are held between the first cardboard strip, which is essentially U-shaped, and the second cardboard strip which is placed on top and which is essentially planar. Furthermore, it is especially advantageous that the distance at which the first and the second cardboard strips are spaced from one another corresponds essentially to the thickness of the goods to be presented because, in this case, the goods are then held between the two cardboard strip in an essentially force-locking manner.

In another embodiment of the present invention the openings have two narrow sides and the first cardboard strip has respective first and second folds to provide essentially a U-shaped cross-section to the first cardboard strip, and the folded portions have respective first and second folds for providing an essentially U-shaped cross-section to the second cardboard strip, whereby the first and second folds of the folded portions are positioned in the first and second folds of the first cardboard strip at the narrow sides of the openings and whereby furthermore cross-pieces are attached to the first cardboard strip for forming longitudinal sides of the openings. In this inventive embodiment the goods to be presented are held between the first and the second cardboard strips whereby the longitudinal sides of the openings provided at the second cardboard strip are folded in the direction toward the first cardboard strip and are fastened thereto. Due to this embodiment, it is possible in a simple manner to remove the goods presented in the packaging because the goods may easily be gripped and are only held in the openings due to the narrow sides of the opening provided at the second cardboard strip.

Above the receiving means an information section is provided for printing thereon promotional slogans or information for the operation of the goods presented in the packaging. These information sections, according to a further specific embodiment of the present invention, are preferably essentially circular in order to provide a sales-promoting effect on the customer.

In another embodiment of the present invention a second information section may be arranged below the receiving means, viewed in the longitudinal direction.

In order to present a plurality of identical or different goods, it is furthermore provided that a plurality of receiving means are arranged adjacent one another in the longitudinal direction or adjacent one another transverse to the longitudinal direction of the cardboard strips. This is advantageous because, for example, a plurality of dispensers for razor blade units may be presented in one packaging or a dispenser for razor blade units may be arranged adjacent to the corresponding shaving device in the same packaging.

In another advantageous embodiment of the present invention a hole penetrating the first and the second cardboard strips is arranged above the receiving means for suspending the packaging from a respective stand which suggest to the customer a great selection and variety of goods.

DESCRIPTION OF PREFERRED EMBODIMENTS

The present invention will now be described in detail with the aid of several specific embodiments utilizing FIGS. 1 through 6.

Figure 3:
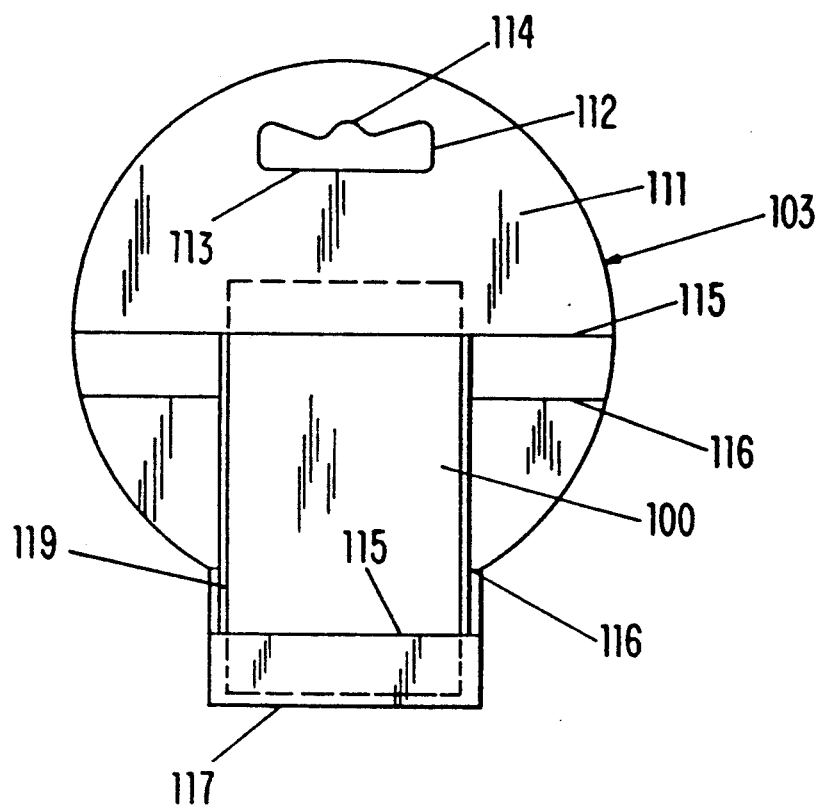
FIG. 3 is a second embodiment of the packaging of the present invention in a plan view.
Figure 4:
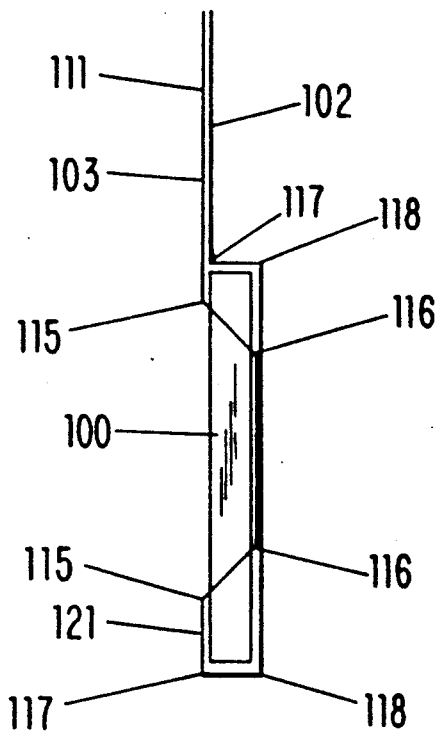
FIG. 4 is a packaging according to FIG. 1 in a side view.
Figure 5:
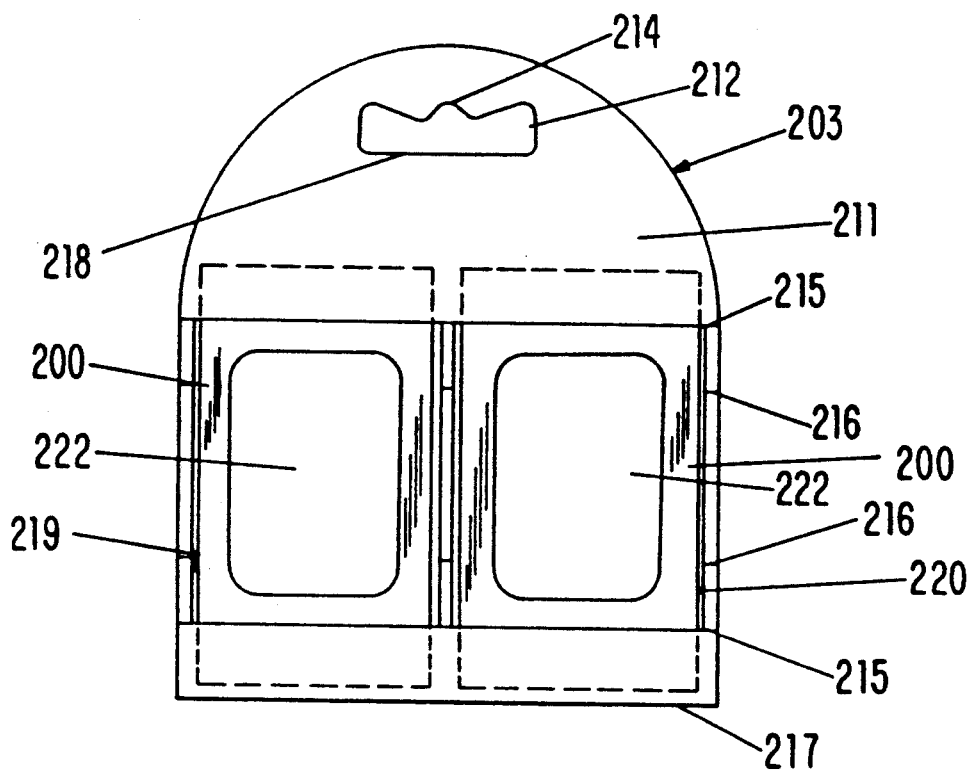
FIG. 5 shows a third embodiment of the packaging of the present invention in a plan view.
Figure 6:
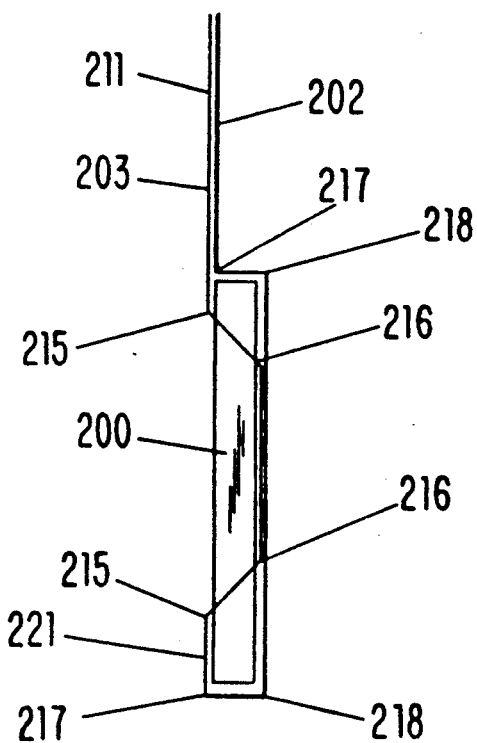
FIG. 6 shows the packaging according to FIG. 5 in a side view.

The packaging represented in FIGS. 1 through 6 for presenting dispensers 1, 100, 200 containing razor blade units are comprised of a first cardboard strip 2, 102, 202 onto which a second upper cardboard strip 3, 103, 203 is placed. In the following, like elements in the different embodiments will be designated with like reference numerals but from the 100 series for the second embodiment (FIGS. 3 and 4) and the 200 series for the third embodiment (FIGS. 5 and 6).

Figure 2:
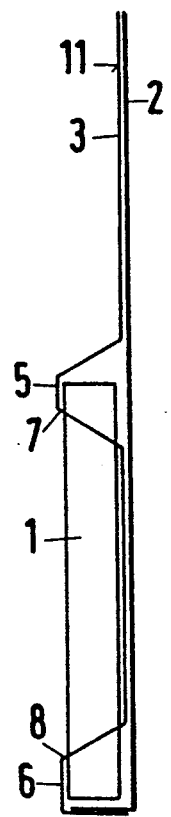
FIG. 2 is a packaging according to FIG. 1 in a side view.

In the first embodiment shown in FIGS. 1 and 2, the upper cardboard strip 3 is provided with two folded portions 5 and 6 extending transverse to the longitudinal direction of the cardboard strip 3 whereby the folded portion 6 is arranged at the lower end of the packaging. The folded portions 5 and 6 are essentially of a trapeze-shaped form and are provided with openings 9, 10 at respective oppositely arranged surfaces 7, 8. The openings 9, 10 represent the receiving means for the dispenser 1 and are essentially rectangular.

Above the folded portion 5, the packaging is provided with an information section 11 which may be provided with promotional slogans or operating information. The information section 11 is embodied as a semi-circle in order to support the promotional effect of the packaging. The information section 11 is provided with a hole 12 which has a lower straight edge 13 and an upper, wavy edge 14. The hole 12 serves as a suspending means when the packaging is presented on so-called suspending stands.

The two cardboard strips 2 and 3 which are arranged atop one another are connected to one another in the area of the information section 11 and the lower folded portion 6 by gluing. Furthermore, the two cardboard strips 2, 3 are glued together in the area between the folded portions 5 and 6.

In this embodiment, the dispenser 1 is inserted in the area of the folded portion 6 from the bottom into the openings 9, 10 before the cardboard strips 2, 3 are glued together. The glue connection in the area of the folded portion 6 in this embodiment is essentially free of stress loads generated by the dispenser 1.

In the second embodiment represented in FIGS. 3 and 4, the first and the second cardboard strips 102, 103 are provided as one single, continuous part. The first cardboard strip 102, below the information, section 111 of the second cardboard strip 103, is folded in a U-shaped manner. The upper cardboard strip 103, below the information section, 111, is also folded in an essentially U-shaped manner whereby the folds 115, 116 of the cardboard strip 103 are arranged within the folds 117, 118 of the first cardboard strip 102 so that the receiving means for the dispenser 100 is formed by the portions of the cardboard strip 103 which project into the U-shaped receptacle and the openings 119, 120. Thus, the dispenser 100 is held between the second cardboard strip 103 and the first cardboard strip 102.

In the area of the information section 111 the two cardboard strips 102, 103 are glued together. Between the fold 115 and the fold 117, a further information section 121 is arranged which may also be used for promotional purposes or for providing information. The second embodiment of the inventive packaging is also provided with a hole 112 in the area of the information section 111 which is shaped corresponding to the embodiment of the hole 12 shown in FIG. 1.

A third embodiment according to FIGS. 5 and 6 may be used for the presentation of two adjacently arranged dispensers 200. The packaging represented in FIGS. 5 and 6 corresponds otherwise essentially to the packaging of FIGS. 3 and 4. In the embodiment corresponding to FIGS. 5 and 6, the first cardboard strip 202 is provided with openings or windows 222 in the area between the folds 216 which allows the display of the goods from the backside of the packaging. These windows (openings) 22 may be embodied in various manners so that they correspond to the respective goods to be represented, for example, the dispenser 1.

The present invention is, of course, in no way restricted to the specific disclosure of the specification and drawings, but also encompasses any modifications within the scope of the appended claims.

What I claim is:

1. A packaging for presenting goods of an essentially parallelepipedal shape, said packaging comprising:
   a first cardboard strip having a front surface and a back surface;
   a second cardboard strip having a front surface and a back surface, with said back surface of said second cardboard strip being connected to said front surface of said first cardboard strip, said second cardboard strip having a receiving means for holding at least one dispenser;
   said second cardboard strip having a first and a second folded portion extending parallel to one another and spaced from one another in a direction transverse to a longitudinal direction of said second cardboard strip;
   said receiving means being in the form of a first and a second opening, with said first opening being provided in said first folded portion and said second opening being provided in said second folded portion, said openings having two narrow sides; and
   wherein said first cardboard strip has respective first and second folds to provide essentially a U-shaped cross-section to said first cardboard strip, and wherein said folded portions have respective first and second folds for providing an essentially U-shaped cross-section to said second cardboard strip, with said first and second folds of said folded portions being positioned in said first and second folds of sad first cardboard strip at said narrow sides of said openings, and further comprising cross-pieces attached to said first cardboard strip for forming longitudinal sides of said openings.

2. A packaging according to claim 1, wherein said first cardboard strip is folded in a U-shaped manner so that said first and said second cardboard strips in an area of said first and second openings are spaced at a distance from one another.

3. A packaging according to claim 2, wherein said distance corresponds approximately to a thickness of the goods.

4. A packaging according to claim 1, further comprising an information section on said front surface of said second cardboard strip arranged above said receiving means in said longitudinal direction.

5. A packaging according to claim 4, wherein said information section is essentially circular.

6. A packaging according to claim 4, further comprising a second information section arrange below said receiving means in said longitudinal direction.

7. A packaging according to claim 1, wherein a plurality of said receiving means are provided, said receiving means being arranged adjacent one another in said longitudinal direction of said cardboard strip.

8. A packaging according to claim 1, wherein a plurality of said receiving means are provided, said receiving means being arranged adjacent one another transverse to said longitudinal direction of said cardboard strip.

9. A packaging according to claim 1, wherein a hole penetrating said first and said second cardboard strips is arranged above said receiving means for suspending said packaging.

10. A packaging according to claim 1, wherein said first cardboard strip has at least one window for displaying the goods.

11. A packaging according to claim 1, wherein said first and said second folded portions have an essentially square cross-section and project from said front surface of said second cardboard strip.

12. A packaging according to claim 1, wherein said first and said second cardboard strips are one single, continuous cardboard strip.

* * * * *